United States Patent
Muff et al.

(10) Patent No.: US 8,139,061 B2
(45) Date of Patent: Mar. 20, 2012

(54) FLOATING POINT EXECUTION UNIT FOR CALCULATING A ONE MINUS DOT PRODUCT VALUE IN A SINGLE PASS

(75) Inventors: Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/184,324

(22) Filed: Aug. 1, 2008

(65) Prior Publication Data

US 2010/0031009 A1 Feb. 4, 2010

(51) Int. Cl.
*G06T 15/00* (2011.01)

(52) U.S. Cl. .......................... 345/426; 345/619; 712/214

(58) Field of Classification Search .................. 345/426, 345/619, 629; 712/214
See application file for complete search history.

(56) References Cited

U.S. PATENT DOCUMENTS 7,941,644 B2 * 5/2011 Mejdrich et al. .............. 712/214
* cited by examiner

*Primary Examiner* — Phu Nguyen
(74) *Attorney, Agent, or Firm* — Wood, Herron & Evans LLP

(57) ABSTRACT

A floating point execution unit calculates a one minus dot product value in a single pass. As such, the dependency that otherwise would be required to perform the calculations is eliminated, resulting in a substantially faster performance of such calculations. The floating point execution unit may be used, for example, to accelerate pixel shading algorithms such as Fresnel and electron microscope effects.

22 Claims, 6 Drawing Sheets

FLOATING POINT EXECUTION UNIT FOR CALCULATING A ONE MINUS DOT PRODUCT VALUE IN A SINGLE PASS

FIELD OF THE INVENTION

The invention is generally related to data processing, and in particular to processor architectures and floating point execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector. The aforementioned techniques may also be combined, resulting in a multithreaded vector execution unit architecture that enables multiple threads to issue SIMD instructions to a vector execution unit to process "vectors" of data points at the same time. In addition, multiple execution units may be used to permit independent operations to be performed in parallel, further increasing overall performance.

Nonetheless, a number of different types of calculations still present performance problems for conventional processing units. For example, several computer graphics shading effects rely on one minus dot product vector floating point calculations that can limit performance in a processing unit.

Two of these computer graphics shading effects, the Fresnel effect and the "electron microscope" effect, seek to improve the realism of an image by highlighting the edges of objects. Both effects have been found to require calculations that have a necessity to increase the intensity of pixels as their surface normals in 3D space grow more perpendicular to the viewer. Typically, to calculate the intensity, both of these techniques take the 3-word dot product of the surface normal with the view vector, and subtract that result from 1.0, a calculation that is referred to hereinafter as a one minus dot product vector floating point calculation.

Conventionally, the one minus dot product vector floating point calculation requires two separate calculations, each initiated by a separate floating point instruction. The first calculation is the dot product calculation, and the second calculation is a subtraction calculation, in which the result of the dot product calculation is subtracted from 1.0. Furthermore, since the result of the first calculation is used in the second calculation, the second instruction used to perform the subtraction calculation is dependent on the first instruction used to perform the dot product calculation.

A one minus dot product vector floating point calculation is typically performed per pixel for each object in a frame. Thus, for each viewable pixel in an object, two dependent instructions must be performed, causing the one minus dot product floating point calculation to be performance-critical.

A need therefore exists in the art for a manner of improving the performance of a processing unit is performing one minus dot product vector floating point calculations.

SUMMARY OF THE INVENTION

The invention addresses these and other problems associated with the prior art by providing a floating point execution unit that is capable of calculating a one minus dot product value in a single pass. As such, the dependency that otherwise would be required to perform the calculations is eliminated, resulting in a substantially faster performance of such calculations.

Consistent with one aspect of the invention, a circuit arrangement and method are provided for executing a first instruction of a first instruction type from an instruction set with a floating point execution unit to calculate a one minus dot product value in a single pass of the vector floating point execution unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
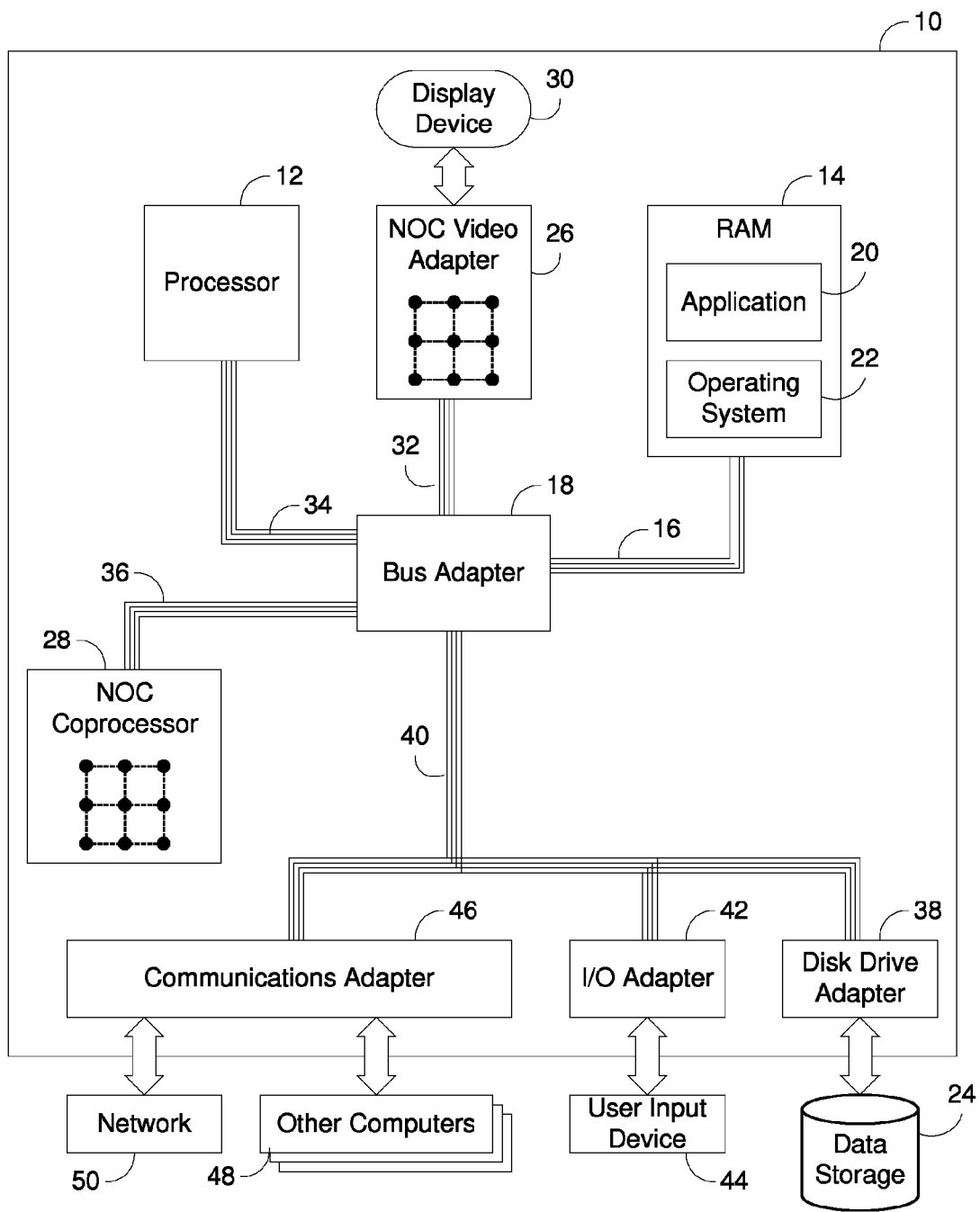
FIG. 1 is a block diagram of exemplary automated computing machinery including an exemplary computer useful in data processing consistent with embodiments of the present invention.

Embodiments consistent with the invention utilize a floating point execution unit that is capable of calculating one minus dot product values in a single pass. As noted above, one minus dot product values are calculated frequently in a number of pixel shading effects using in image processing, e.g., to apply Fresnel or electron microscope effects. One minus dot product calculations are typically used to calculate intensity values for individual pixels based upon the dot product of a surface normal vector (i.e., the vector perpendicular to the surface of an object at the pixel) and a view vector (i.e., the vector from the "eye" to the pixel).

Given that such calculations must be performed per pixel for each object in a frame, such calculations can be performance critical, so any improvements in the performance of such calculations can have an appreciable effect on overall performance. In conventional floating point execution units, however one minus dot product values must be calculated using at least two floating point instructions, and the second floating point instruction is necessarily dependent on the first floating point instruction. This means that in image processing applications, for each viewable pixel in an object, two dependent instructions must be performed. For a Fresnel effect, for example, the intensity of a pixel can be calculated as follows:

Intensity=1.0−dot(Normal,View)

In a conventional floating point execution unit, e.g., that supports Power architecture VMX128 instructions, this calculation may be performed as shown in Table I below:

TABLE I

Conventional One Minus Dot Product Calculation the V1 vector register contains the Normal vector x,y,z
the V2 vector register contains the View vector x,y,z
the V5 vector register contains the constant 1.0 in x,y,z, w words
vmsum3fp128   V3, V1, V2   # Compute dot(N,V)
vsubfp128     V4, V5, V3   # Compute 1.0 - dot(N, V)

As can be seen from the above code listing, the subtract instruction is dependent upon the result from the dot product. In a typical vector floating point instruction unit architecture, dot products may take six cycles to complete, while subtracts may take four cycles. Thus, execution of the above code would stall the subtract operation until the sixth cycle, leading the result to not be available until the ninth cycle.

In contrast, with embodiments consistent with the invention, a vector floating point execution unit is provided to support a new instruction, referred to herein as vdotsubfp, and to execute the instruction in a single pass through the vector floating point execution pipeline. In the illustrated embodiments, a four word vector floating point execution unit executes a vdotsubfp instruction by negating the result of a three way dot product of two input vectors and forcing 1.0 down the fourth unused lane, and performing a sum of all four word lanes, resulting in 1.0−dot3(N,V) in only one pipeline pass instead of two. In addition, one less register is typically consumed. The resulting code listing is shown below in Table II:

TABLE II

Vdotsubfp One Minus Dot Product Calculation the V1 vector register contains the Normal vector x,y,z
the V2 vector register contains the View vector x,y,z
vdotsubfp     V3, V1, V2   # Compute 1.0 - dot(N,V)

It will be appreciated that various instruction types and formats may be supported to implement the aforementioned calculation, and that the invention may be utilized in connection with a wide variety of floating point architectures and instruction sets. In addition, it will be appreciated that the manner in which such instructions may be executed by a floating point execution unit to implement such instructions in a single pass may differ in other embodiments. The invention is therefore not limited to the particular instruction format and floating point execution unit architecture described herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
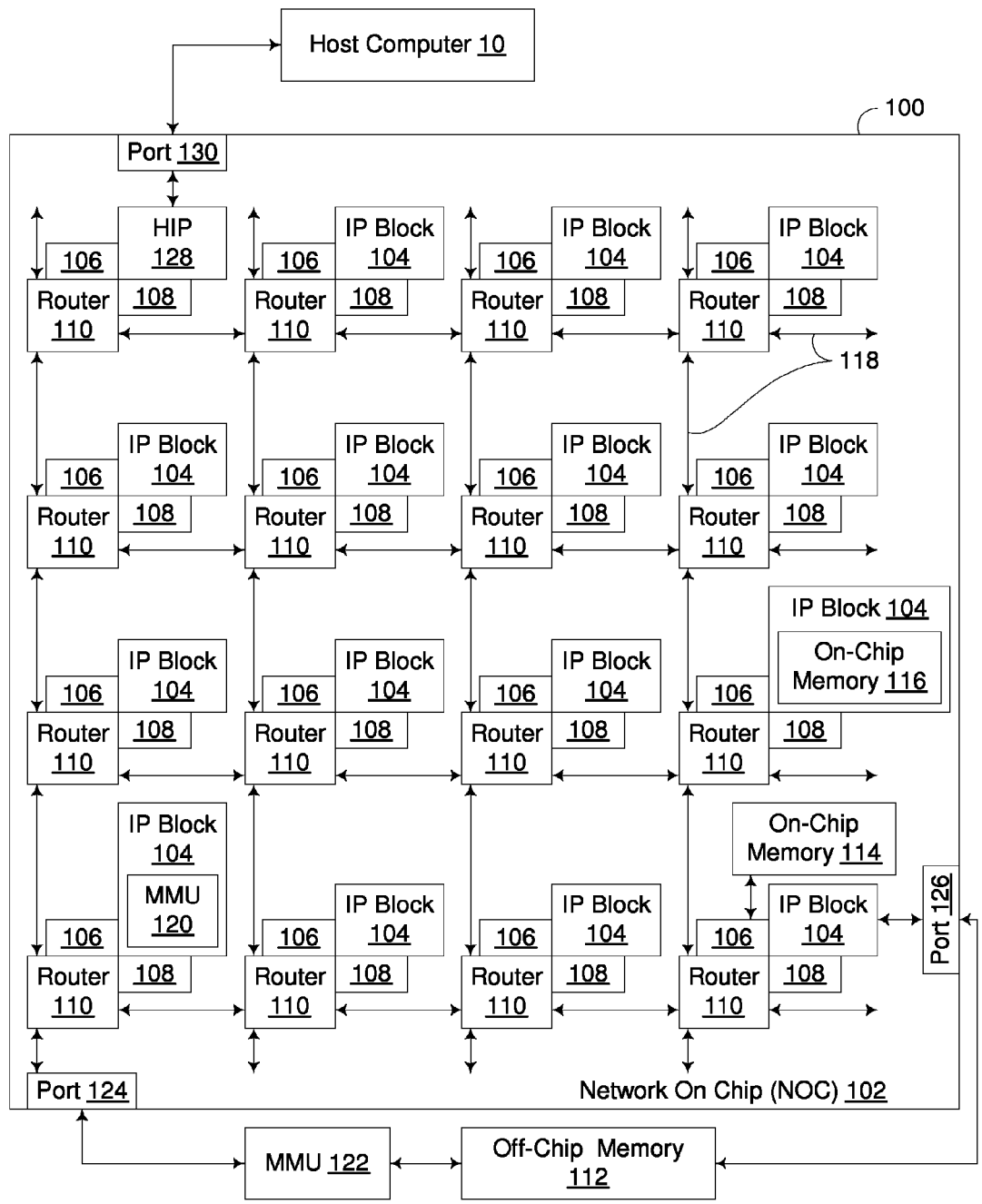
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
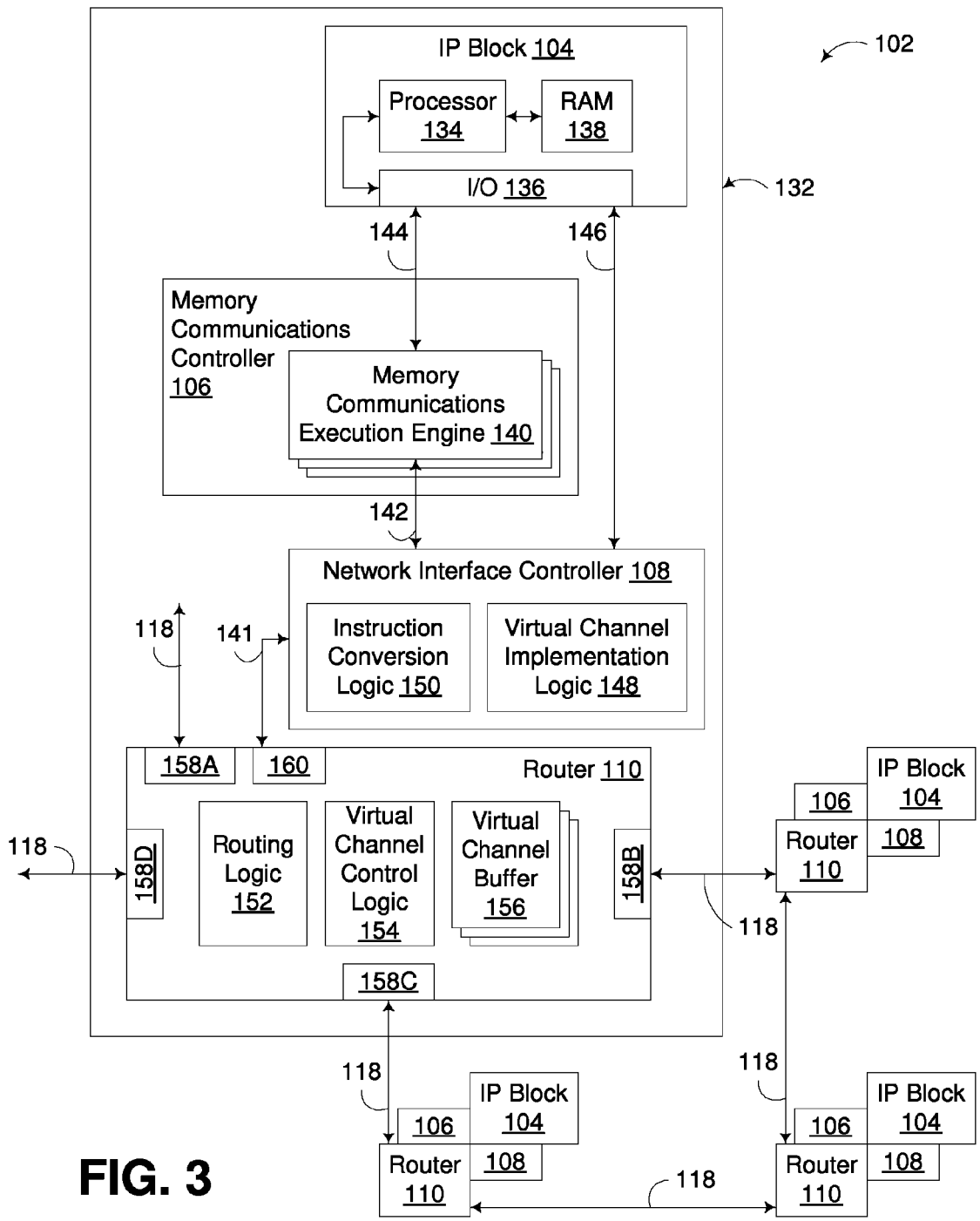
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
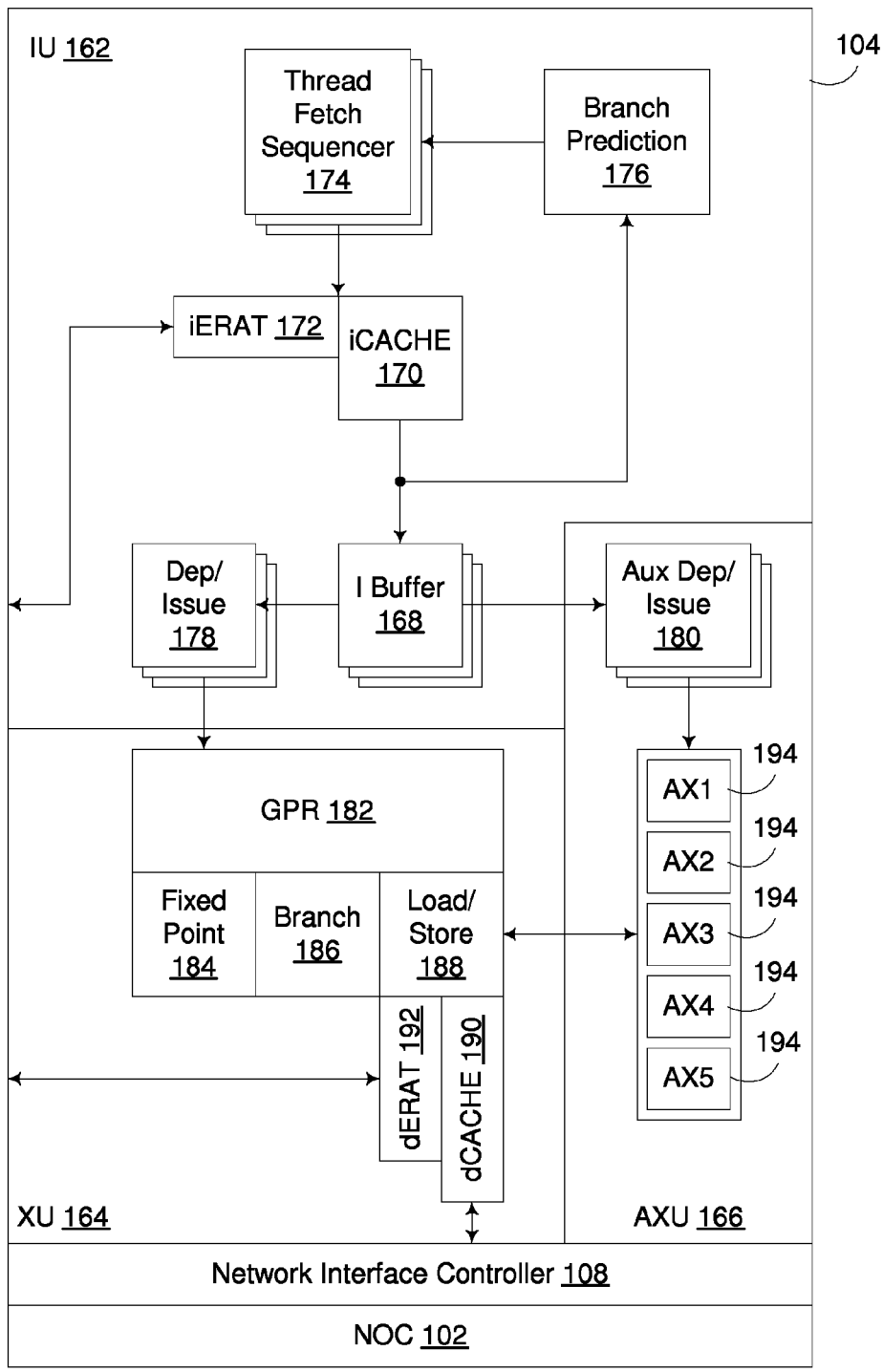
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Figure 5:
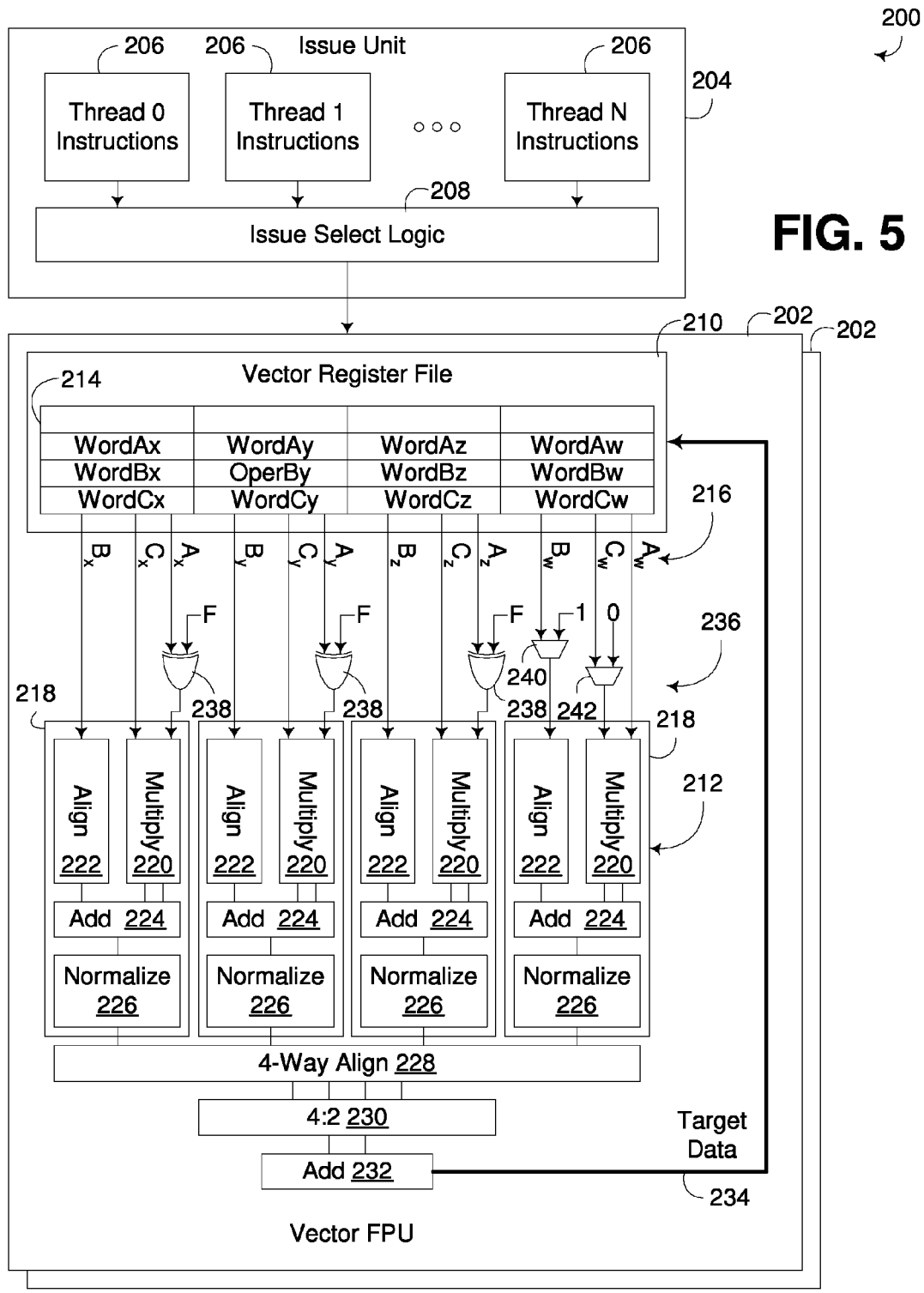
FIG. 5 is a block diagram of a processing unit incorporating a vector floating point execution unit consistent with the invention, and capable of being implemented within an IP block from the NOC of FIG. 2.

Floating Point Execution Unit with Support for Single Pass One Minus Dot Product Calculations Turning now to FIG. 5, this figure illustrates an exemplary processing unit 200 incorporating a floating point execution unit 202 supporting single pass one minus dot product calculations consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Floating point execution unit 202 is implemented as a vector floating point execution unit that receives floating point instructions from issue logic 204. Issue logic 204 includes issue select logic 208 that is capable of issuing instructions from a plurality (N) of threads, illustrated at 206. Issue select logic 208 operates to schedule the issuance of instructions by the various threads, and typically includes logic for managing dependencies between instructions, in a manner generally understood in the art. When multiple execution units 202 are supported, issue select logic 208 is also capable of issuing multiple instructions to the multiple execution units each cycle. In some embodiments, however, only one execution unit may be supported, and furthermore, in some embodiments multi-threaded issue of instructions may not be supported.

Floating point execution unit 202 processes instructions issued to the execution unit by issue unit 204, and includes a register file 210 coupled to a multi-stage execution pipeline 212 capable of processing data stored in register file 210 based upon the instructions issued by issue logic 202, and storing target data back to the register file. Execution unit 202 may be implemented as a number of different types of execution units, e.g., a generic floating point unit, or a specialized execution unit such as a graphics processing unit, encryption/decryption unit, coprocessor, XML processing unit, etc.

In the implementation illustrated in FIG. 5, for example, multi-stage execution pipeline 212 is implemented as a vector floating point unit, e.g., as might be used for image processing, which processes single instruction multiple data (SIMD) instructions issued to the execution unit by issue logic 204. Register file 210 includes a plurality (e.g., 128) of vector registers 214, each including a plurality (e.g., four) words. A plurality of register file inputs and outputs (not shown) are provided to write floating point values into selected registers and output the contents of selected registers to the pipeline 212 for processing. A plurality of operand inputs 216 are provided between register file 210 and multi-stage execution pipeline 212 to provide floating point vectors to the pipeline for processing. Pipeline 212 includes a plurality (e.g., four) processing lanes or sub-units 218 capable of processing vectors stored in register file 210 based upon the instructions issued by issue logic 204, and storing target data back to a vector register in register file 210.

Given the configuration of execution unit 202 as a floating point unit usable in image processing applications, each processing lane 218 is configured to process floating point instructions. While a wide variety of other floating point architectures may be used in the alternative, execution unit 202 includes a pipelined floating point execution architecture capable of operating on three vector operands, denoted A, B and C. For vector operations, four 32-bit word vectors are supported, with the words in each vector being denoted as X, Y, Z and W, and as such, each processing lane 218 receives three operand words, one from each vector. Thus, for example, for the processing lane 218 that processes the X word from each vector, the operands fed to that processing lane are denoted as $A_X$, $B_X$ and $C_X$.

Each processing lane 218 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 218 is also pipelined to further improve performance. Accordingly, each processing lane 218 includes a plurality of pipeline stages for performing one or more operations on the operands. For example, for a first stage, each processing lane may include a multiplier 220 for multiplying the A and C operands. In one embodiment of the invention, the multiplication of operands may be performed in a first stage of the pipeline as illustrated in FIG. 5.

Each processing lane 218 may also include an aligner 222 for aligning operand B with the product computed by multiplier 220, in parallel with the computation of the product. While alignment is shown in the same pipeline stage in FIG. 5, one skilled in the art will recognize that the multiplication and alignment may be performed in separate pipeline stages in other embodiments.

Each processing lane 218 may also include an adder 224 for adding two or more operands. In one embodiment (illustrated in FIG. 5), each adder 224 is configured to receive the product computed by multiplier 220 (output as a sum and carry), and add the product to the aligned operand output by aligner 222. Each adder 224 may also include leading zero anticipator circuitry. Therefore, each processing lane 218 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 218 may also include a normalizing stage. Accordingly, a normalizer 226 may be provided in each processing lane. Normalizer 226 may be configured to represent a computed value in a convenient exponential format. For example, normalizer 226 may receive the value 0.0000063 as a result of an operation. Normalizer 226 may convert the value into a more suitable exponential format, for example, $6.3 \times 10^{-6}$. A rounding stage (not shown) may also be provided to round a computed value to a desired number of decimal points.

For the purposes of one minus dot product calculations (as well as other calculations such as other dot product calculations), execution unit 202 also includes a four-way aligner 228, a 4:2 compressor 230, and an adder 232 that collectively sum the outputs of the four processing lanes 218 to generate a scalar result value. The output of adder 232 is provided as target data 234, which is written to a destination register in register file 210.

One skilled in the art will recognize that embodiments of the invention are not limited to the particular pipeline stages, components, and arrangement of components described above and in FIG. 5. For example, in some embodiments, aligner 222 may be configured to align operand B, a product computed by multiplier 220, or both. Furthermore, embodiments of the invention are not limited to the particular components described in FIG. 5. Any combination of the illustrated components and additional components such as, but not limited to, leading zero anticipators, dividers, etc., which may be required to process other types of instructions supported by the floating point execution unit, may be included in each processing lane 218 consistent with the invention.

Additional logic, illustrated at 236, is implemented at the start of each processing lane 218 to facilitate the processing of one minus dot product calculations. To implement a one minus dot product calculation in a single pass through multi-stage execution pipeline 212, a three way dot product between two three word input vectors (A,C) is calculated in the first three processing lanes 218, that dot product is negated, and a 1.0 value is forced down the fourth processing lane, with a sum performed on all four word lanes, resulting in 1.0−dot3 (A,C) in only one pipeline pass instead of two.

Logic 236 includes, in each of the first three processing lanes 218, an XOR gate 238 that selectively flips or inverts the sign bits of the x, y and z words of the A input vector ($A_x$, $A_y$, $A_z$). Each XOR gate is controlled by an F control signal that flips the sign bits of the x, y and z words when asserted. In the alternative, the C input vector may be inverted, or the inversion can be performed after or in connection with multiplying the A and C input vectors together. In another embodiment, a value of −1.0 may be forced down the fourth processing lane, with the end result (after summing all four processing lanes) inverted to generate the one minus dot product calculation. Other manners of inverting a dot product will be apparent to one of ordinary skill in the art having the benefit of the instant disclosure.

To force a value of 1.0 down the fourth processing lane, two multiplexers 240, 242 are interposed in the B and C vector inputs to the fourth processing lane. First inputs to each multiplexer 240, 242 pass unchanged the fourth words of the B and C input vectors. The second input of multiplexer 240 passes a value of 1.0, while the second input of multiplexer 242 passes a value of 0.0. When the second inputs of multiplexers 240, 242 are selected, the 0.0 value passed by multiplexer 242 forces multiplier 220 to output a 0.0 value, which is then summed with the 1.0 value passed to adder 224 by multiplexer 240, resulting in a value of 1.0 output from the fourth processing lane 218.

It will be appreciated that other manners of forcing a 1.0 value down the fourth processing lane may be used in other embodiments. For example, multiplexer 242 may be disposed in the A input vector path instead of the C input vector path. In the alternative, a multiplexer may be disposed at a later stage in the pipeline to insert a 1.0 value into the pipeline, e.g., to override the output of any stage of the fourth processing lane. Other manners of forcing a 1.0 value down a processing lane will be apparent to one of ordinary skill in the art having the benefit of the instant disclosure.

In the illustrated embodiments, one or more specific instruction types in the instruction set supported by processing unit 200 are dedicated to performing one minus dot product calculations. Decode logic disposed within processing unit 200, in response to receiving an instruction in an instruction stream that matches the dedicated instruction type, controls XOR gates 238 and multiplexers 240, 242 to configure multi-stage execution pipeline 212 to perform a one minus dot product calculation. In one embodiment compatible with the Power VMX128 instruction set, a vdotsubfp instruction type may be defined in the instruction set and configured to perform a one minus dot product calculation on two vector registers identified as input operands A, C to the instruction. In response to receiving a vdotsubfp instruction, the decode logic in processing unit 200 controls XOR gates 238 to invert the dot product terms output from the first three processing lanes 218 ($A_xC_x$, $A_yC_y$, $A_zC_z$), and controls multiplexers 240, 242 to pass the second inputs and thereby force a value of 1.0 down the fourth processing lane. When the outputs of the four processing lanes ($-A_xC_x$, $-A_yC_y$, $-A_zC_z$, 1.0) are summed, the resulting output value ($-A_xC_x+-A_yC_y+-A_zC_z+1.0$) is equivalent to (1.0−dot3(A,C)).

When contrasted with the aforementioned conventional floating point execution unit that calculates a one minus dot product value in two passes, and requires nine cycles, a processing unit consistent with the invention, and capable of calculating a dot product in six cycles, can likewise perform a one minus dot product calculation in six cycles, providing a result in three fewer cycles. In addition, implementation of support for one minus dot product calculations typically requires the addition of little additional circuit area and has minimal impact on timing.

Figure 6:
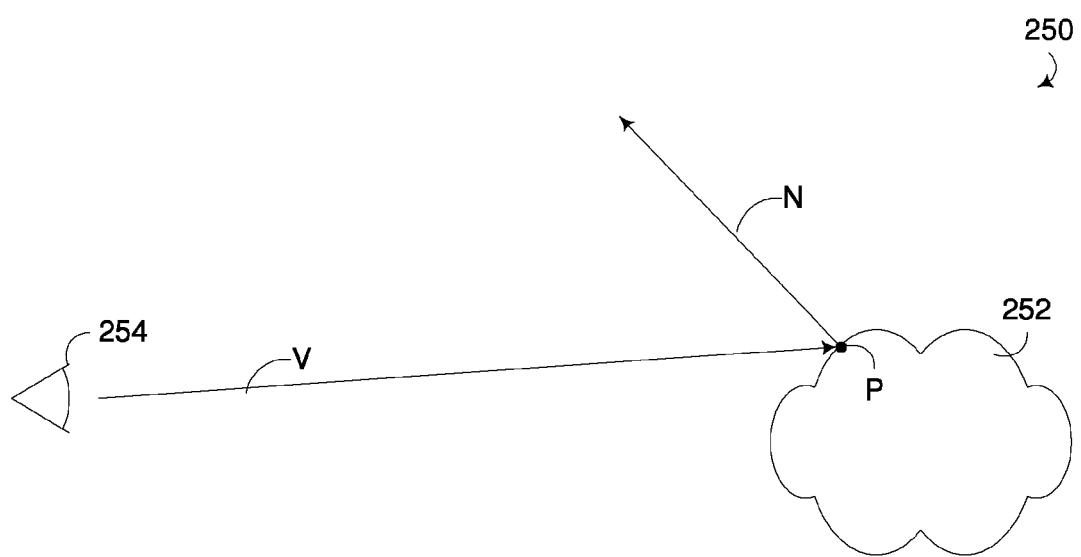
FIG. 6 is a block diagram of an exemplary scene, illustrating surface normal and view vectors for which one minus dot product calculations may be calculated in connection with applying pixel shading effects.

While the aforementioned one minus dot product instructions may be used to perform one minus dot product calculations for a wide variety of applications, one particularly suitable application is in connection with applying pixel shading effects such as Fresnel and electron microscope effects to objects in an image. FIG. 6, for example, illustrates an exemplary scene 250 having an object 252. When rendering scene 250 from a viewpoint 254, each visible pixel on object 252 is rendered, and in connection with such rendering, it may be desirable to apply a pixel shading effect such as a Fresnel effect to such pixel, where an intensity value for the Fresnel effect is calculated as one minus the dot product of a view vector and the surface normal vector for the pixel being rendered. Thus, for a pixel P on object 252, the surface normal vector N is projected from the surface of object 252, and the view vector is projected from viewpoint 254 to pixel P. Calculation of the intensity value may therefore use a single vdotsubfp instruction, with the surface normal and view vectors N, V supplied as input operands to the instruction.

Various modifications may be made to the illustrated embodiments without departing from the spirit and scope of the invention. For example, the forced 1.0 value may be passed down a processing lane other than the fourth processing lane, and other logic may be used to invert the outputs of each processing lane and/or force a 1.0 value down a processing lane. Other modifications will be apparent to one of ordinary skill having the benefit of the instant disclosure. Therefore, the invention lies in the claims hereinafter appended.

What is claimed is:

1. A method of applying a shading effect to a pixel in an image using a vector floating point execution unit, the method comprising:
   receiving a one minus dot product instruction defined in an instruction set supported by the processing unit, the one minus dot product instruction configured to receive a surface normal vector and a view vector, each of the surface normal and view vectors including x, y and z values; and
   calculating an intensity value from the surface normal vector and the view vector by executing the one minus dot product instruction in a single pass through a plurality of stages of a multi-stage pipeline of the vector floating point execution unit, wherein executing the one minus dot product instruction includes:
      multiplying the respective x, y and z values from the surface normal and view vectors in respective first, second and third processing lanes of the multi-stage pipeline of the vector floating point execution unit;
      negating each of the first, second and third processing lanes of the vector floating point execution unit;
      forcing a fourth processing lane of the multi-stage pipeline of the vector floating point execution unit to a 1.0 value; and
      summing the first, second, third and fourth processing lanes to generate the intensity value.

2. The method of claim 1, wherein negating each of the first, second and third processing lanes includes negating a respective x, y and z value from one of the surface normal and view vectors prior to multiplying the respective x, y and z values from the surface normal and view vectors.

3. The circuit arrangement of claim 1, wherein the one minus dot product value is configured to use as input first and second vectors and is calculated using the equation:

1.0−dot(first vector,second vector);

where dot( ) is a dot product of the first and second vectors.

4. A circuit arrangement, comprising a vector floating point execution unit including a pipeline with a plurality of stages and configured to execute a first instruction of a first instruction type from an instruction set to calculate a one minus dot product value in a single pass through the plurality of stages of the pipeline of the vector floating point execution unit, wherein the pipeline of the vector floating point execution unit includes:
   a plurality of processing lanes, each processing lane including multiplication logic configured to generate a product; and
   addition logic in communication with the plurality of processing lanes and configured to sum respective outputs of the plurality of processing lanes;
wherein the vector floating point execution unit is configured to, in response to the first instruction, and in the single pass through the plurality of stages of the pipeline, use the multiplication logic in multiple processing lanes among the plurality of processing lanes to calculate a plurality of products for the one minus dot product value, and use the addition logic to sum the plurality of products with a constant value.

5. The circuit arrangement of claim 4, wherein each of the first and second vectors includes first, second and third values, wherein the plurality of processing lanes includes first, second, third and fourth processing lanes, wherein the first, second and third processing lanes are configured to, during execution of the first instruction of the first instruction type, multiply the respective first, second and third values of the first and second vectors together to generate first, second and third products, and wherein the vector floating point execution unit is configured to force the fourth processing lane to generate a 1.0 value and sum the 1.0 value with the first, second and third products during execution of the first instruction.

6. The circuit arrangement of claim 5, wherein the addition logic includes an adder coupled to outputs of the first, second, third and fourth processing lanes to add the 1.0 value with the first, second and third products during execution of the first instruction of the first instruction type.

7. The circuit arrangement of claim 6, wherein the vector execution unit is further configured to, during execution of the first instruction of the first instruction type, invert the first, second and third products prior to adding the 1.0 value with the first, second and third products.

8. The circuit arrangement of claim 7, wherein each of the first, second and third processing lanes includes a sign inverter configured to invert the respective first, second and third values of the first vector.

9. The circuit arrangement of claim 8, wherein the fourth processing lane includes:
   a multiplier disposed in the multiplication logic and configured to multiply a fourth value from the first vector received at a first operand input with a fourth value from the second vector received at a second operand input;

an aligner configured to align a fourth value from a third vector with an output of the multiplier prior to addition;

a first multiplexer coupled to the second operand input, the first multiplexer having a first input configured to pass the fourth value from the second vector to the second operand input and a second input configured to pass a 0 value to the second operand input, the first multiplexer configured to select the second input during execution of the instruction of the first instruction type; and a second multiplexer coupled to the aligner, the second multiplexer having a first input configured to pass the fourth value from the third vector to the aligner and a second input configured to pass a 1.0 value to the aligner, the second multiplexer configured to select the second input during execution of the instruction of the first instruction type.

10. An integrated circuit device including the circuit arrangement of claim 4.

11. A program product comprising a non-transitory computer readable medium and logic definition program code resident on the computer readable medium and defining the circuit arrangement of claim 4.

12. The circuit arrangement of claim 4, wherein the constant value is selected from the group consisting of a 1.0 value and a −1.0 value.

13. A method of performing a one minus dot product calculation using a vector floating point execution unit, the method comprising:

receiving a first instruction of a first instruction type from an instruction set supported by the vector floating point execution unit; and in response to receiving the first instruction, executing the first instruction by calculating a one minus dot product value in a single pass through a plurality of stages of a pipeline of the vector floating point execution unit, wherein the pipeline of the vector floating point execution unit includes a plurality of processing lanes, each processing lane including multiplication logic configured to generate a product, and addition logic in communication with the plurality of processing lanes and configured to sum respective outputs of the plurality of processing lanes, wherein executing the first instruction includes, in the single pass through the plurality of stages of the pipeline:

using the multiplication logic in multiple processing lanes among the plurality of processing lanes to calculate a plurality of products for the one minus dot product value; and using the addition logic to sum the plurality of products with a constant value.

14. The method of claim 13, wherein the one minus dot product value is configured to use as input first and second vectors and is calculated using the equation:

1.0−dot(first vector,second vector);

where dot( ) is a dot product of the first and second vectors.

15. The method of claim 13, wherein each of the first and second vectors includes first, second and third values, wherein the plurality of processing lanes includes first, second, third and fourth processing lanes, wherein the first, second and third processing lanes are configured to, during execution of the first instruction of the first instruction type, multiply the respective first, second and third values of the first and second vectors together to generate first, second and third products, and wherein the vector floating point execution unit is configured to force the fourth processing lane to generate a 1.0 value and sum the 1.0 value with the first, second and third products during execution of the first instruction.

16. The method of claim 15, wherein the vector execution unit includes an adder coupled to outputs of the first, second, third and fourth processing lanes to add the 1.0 value with the first, second and third products during execution of the first instruction of the first instruction type.

17. The method of claim 16, wherein the vector execution unit is further configured to, during execution of the first instruction of the first instruction type, invert the first, second and third products prior to adding the 1.0 value with the first, second and third products.

18. The method of claim 17, wherein each of the first, second and third processing lanes includes a sign inverter configured to invert the respective first, second and third values of the first vector.

19. The method of claim 18, wherein the fourth processing lane includes:

a multiplier disposed in the multiplication logic and configured to multiply a fourth value from the first vector received at a first operand input with a fourth value from the second vector received at a second operand input;

an aligner configured to align a fourth value from a third vector with an output of the multiplier prior to addition;

a first multiplexer coupled to the second operand input, the first multiplexer having a first input configured to pass the fourth value from the second vector to the second operand input and a second input configured to pass a 0 value to the second operand input, the first multiplexer configured to select the second input during execution of the instruction of the first instruction type; and a second multiplexer coupled to the aligner, the second multiplexer having a first input configured to pass the fourth value from the third vector to the aligner and a second input configured to pass a 1.0 value to the aligner, the second multiplexer configured to select the second input during execution of the instruction of the first instruction type.

20. The method of claim 13, wherein the first instruction is a one minus dot product instruction configured to receive a surface normal vector and a view vector and calculate an intensity value therefrom for use in applying a shading effect to a pixel in an image, each of the surface normal and view vectors including x, y and z values, wherein executing the one minus dot product instruction includes:

multiplying the respective x, y and z values from the surface normal and view vectors in respective first, second and third processing lanes of the vector floating point execution unit;

negating each of the first, second and third processing lanes of the vector floating point execution unit;

forcing a fourth processing lane of the vector floating point execution unit to a 1.0 value; and summing the first, second, third and fourth processing lanes to generate the intensity value.

21. The method of claim 20, wherein negating each of the first, second and third processing lanes includes negating a respective x, y and z value from one of the surface normal and view vectors prior to multiplying the respective x, y and z values from the surface normal and view vectors.

22. The method of claim 13, wherein the constant value is selected from the group consisting of a 1.0 value and a −1.0 value.

* * * * *